United States Patent [19]

Reich

[11] Patent Number: 4,508,357
[45] Date of Patent: Apr. 2, 1985

[54] POWER-OPERATED CHUCK FOR TURNING MACHINES

[75] Inventor: Kurt Reich, Düsseldorf, Fed. Rep. of Germany

[73] Assignee: Paul Forkardt GmbH & Co. KG, Düsseldorf, Fed. Rep. of Germany

[21] Appl. No.: 505,063

[22] Filed: Jun. 16, 1983

[30] Foreign Application Priority Data

Jun. 18, 1982 [DE] Fed. Rep. of Germany ....... 3222751

[51] Int. Cl.$^3$ ............................................. B23B 31/14
[52] U.S. Cl. ......................................... 279/1 C; 279/4
[58] Field of Search ........................... 279/1 C, 4, 2 A

[56] References Cited

U.S. PATENT DOCUMENTS

| | | | |
|---|---|---|---|
| 3,938,815 | 2/1976 | F'Geppert | 279/1 C |
| 3,975,030 | 8/1976 | Akeel et al. | 279/1 C X |
| 4,275,892 | 6/1981 | Rohm | 279/1 C |
| 4,314,760 | 2/1982 | Pruden | 279/1 C |

FOREIGN PATENT DOCUMENTS

| | | | |
|---|---|---|---|
| 2530573 | 1/1977 | Fed. Rep. of Germany | 279/4 |
| 2542570 | 4/1977 | Fed. Rep. of Germany | 279/1 C |
| 2542569 | 4/1977 | Fed. Rep. of Germany | 279/1 C |

*Primary Examiner*—William R. Briggs
*Assistant Examiner*—Glenn L. Webb
*Attorney, Agent, or Firm*—Becker & Becker, Inc.

[57] ABSTRACT

A power-operated chuck, for turning machines, having at least one jaw which is radially movably guided in a chuck body and which is actuated by a pressure medium piston which is movably guided in the chuck body and the working chamber of which is connected to a source of pressure medium via a releasable check valve. The working chamber of the pressure medium cylinder is connected with the pressure chamber of a centrifugal force compensating cylinder, the compensating piston of which is designed as a centrifugal weight and is radially movably guided in the chuck body. The radially outer end of the compensating piston projects into the pressure chamber. So that the system is effective independent of the level of the working pressure, the radially inner end of the compensating piston projects into a relief chamber which is directly connected, i.e. bypassing the check valve, with the source of pressure medium via a short-circuit line.

5 Claims, 7 Drawing Figures

POWER-OPERATED CHUCK FOR TURNING MACHINES

BACKGROUND OF THE INVENTION

The present invention relates to a power operated chuck, for turning machines, having at least one jaw which is radially movably guided in a chuck body, and which is actuated by a pressure medium piston which is movably guided in the chuck body and the working chamber of which is connected to a source of pressure medium by means of a releasable check valve.

During rotation at high cutting speeds, the centrifugal force which acts on the jaws of the chuck effects a loss of clamping force, which has a negative effect on the transferable torque and hence on the possible material removal rate. This is primarily true in the situation where work pieces are externally clamped, with jaws acting radially inwardly on the work piece from the outside. The opposite is true for internal clamping, where the jaws act radially outwardly on the work piece from within a bore of the work piece. Here the centrifugal force exerted on the jaws enhances the clamping force, which can also be undesirable because it can lead to undue deformation of the work piece and hence to undesired deviations of the shape of the surface which is being machined.

For the foregoing reasons, chucks which are to be used at high speeds are often equipped with counter weights, the centrifugal forces of which exert radially inwardly directed compensating forces on each jaw by means of suitable direction-changing means, and thus substantially or completely compensate for the change in clamping force resulting from the speed.

A further possibility for compensating for the centrifugal force is to control the hydraulic pressure in the associated clamping cylinder in conformity with the expected centrifugal force of the jaws. For this purpose, pursuant to German Pat. No. 2 150 885, an electronic control unit which is dependent upon the speed can be used; in a suitable manner, this control unit affects via a pressure regulating valve the effective clamping pressure in conformity with a predetermined operation.

A similar effect is achieved according to German Pat. No. 2 530 573 by means of pistons which are controlled by centrifugal force, are installed in hydraulic clamping cylinders of a clamping device, and increase the effective hydraulic pressure as a function of speed and without external control. In this case, exchangeable releasable check valves are used which are present in many conventional clamping cylinders as safety components.

With both of these known types of chucks, the speed dependent increase in pressure is transferred from the clamping cylinder to the chuck as an increase of the chuck operation force via a connecting member, for example a tie rod or an air tube. The additional closing force of the jaws resulting herefrom is possibly such that the speed dependent loss of clamping force of the clamping jaws is compensated for.

In addition to the widely known construction of power-operated chucks which are operated by the tension or compressive forces of a separate clamping cylinder, chucks are known which operate by applying hydraulic pressure directly or indirectly to the jaws. With such clamping tools, which are known as collect chucks, the force generating elements are accommodated directly in the chuck body. The pressure medium necessary for actuation is generally conveyed to the chuck via a rotary transmission. Here too releasable check valves are provided to protect against possible loss of the hydraulic pressure.

Basically, also with these collect chucks a compensation of the centrifugal force exerted on the jaws is conceivable by means of counter weights associated with each of the jaws, or by an externally controlled increase in pressure. With types of construction where very large bores in comparison to the outer diameter are demanded, and/or where very low overall height is demanded despite the front end or collect construction, not enough installation space is available for the required counter weights. These chucks are therefore necessarily operated at lower speeds, so that the machining capacity which is actually available cannot be utilized at high speed ranges.

Starting with a power-operated chuck for turning machines of the aforementioned general type, it is an object of the present invention to provide a simple and compact system which effectively compensates for the centrifugal force exerted on the jaws of hydraulically actuated chucks, with not only the considerable expense for an electronic control of the hydraulic pressure, but also the mechanical structural expense for counter weights and power transmission means to be avoided.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
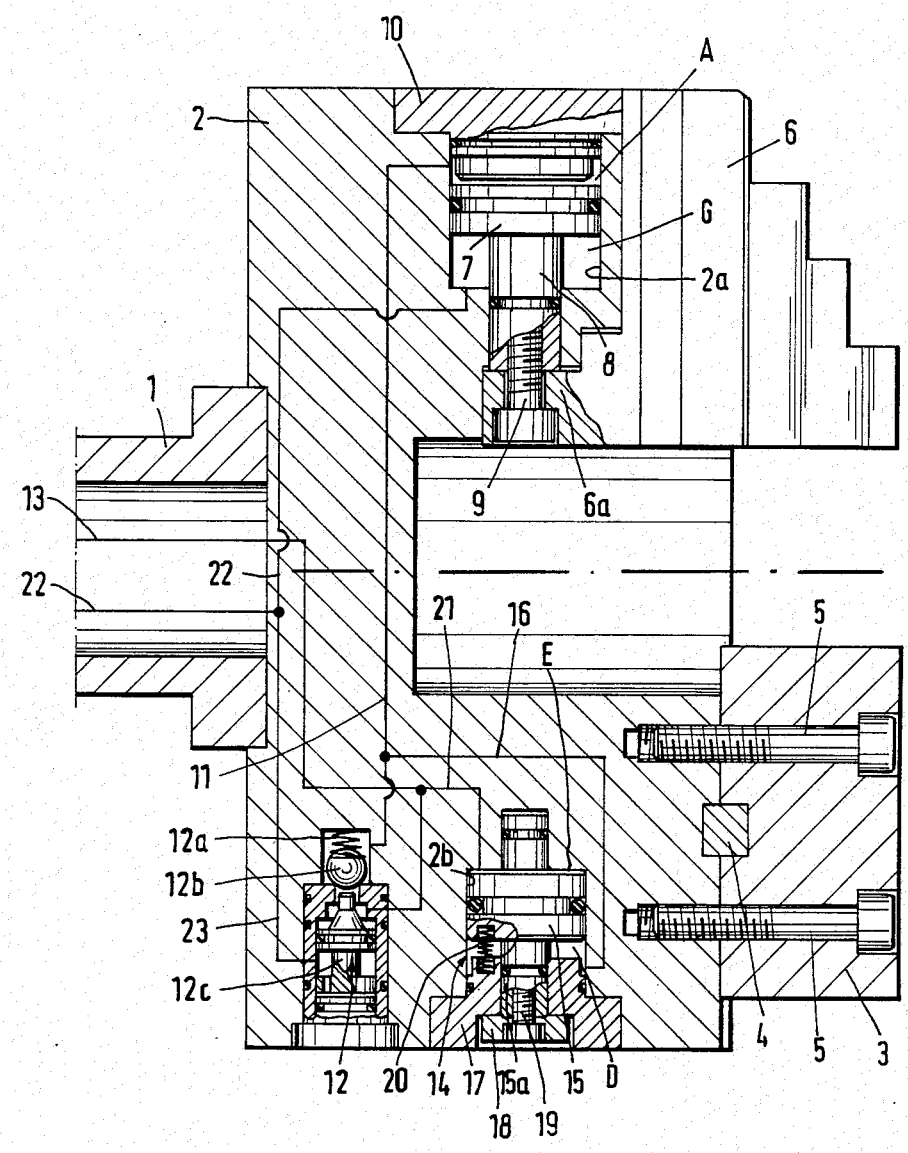
FIG. 1 is a cross section through one inventive embodiment of a chuck having a fixed and a movable jaw, with the latter being actuated by a radially movably guided pressure medium piston.

The working chamber of the pressure medium cylinder is connected with the pressure chamber of a centrifugal force compensating cylinder; the compensating piston of the centrifugal force compensating cylinder is designed as a centrifugal weight and is guided in such a way as to be radially movable in the chuck body. The radially outer end of the compensating piston projects into the pressure chamber.

The inventive proposal results in a power-operated chuck which compensates for centrifugal force and which has the advantage over the known constructions that on the one hand an expense for external control for the speed dependent change of the pressure of the pressure medium is avoided, and that on the other hand there is achieved independent of the respectively provided operating pressure a compensation of the centrifugal force by means of a compensating piston which is designed as a centrifugal weight and which, in contrast to the heretofore known counter weights, is compact and has a small structural expense, so that it can also be used for chucks which have large through-bores or short overall heights.

In order to achieve a reliable return of the compensating piston when the chuck is stopped, it is proposed pursuant to a further feature of the present invention that the compensating piston be stressed by a return spring which opposes the centrifugal force.

The radially-inner end of the compensating piston may inventively project into a relief chamber which is directly, i.e. by-passing the check valve, connected with the source of pressure medium via a connecting line, for example a short-circuit line. In this way, the compensating piston, which acts as a centrifugal weight, is effective independent of the level of the working pressure.

The present invention can be used not only for power-operated chucks which have only a single jaw, but also for chucks which have a plurality of jaws which are radially movable in the chuck body. In the latter case, pursuant to a further development of the present invention, each jaw may be actuated by its own pressure medium piston. Inventively, the working chambers of all of these pressure medium pistons are connected with one another and with the pressure chamber of a common centrifugal force compensating cylinder. Consequently, only one compensating piston, which acts as a centrifugal weight, is required, even with a chuck having several jaws.

Since it is customary with a number of chucks to divide the jaws into base parts and top parts which are exchangeably mounted on the base parts, the weight of the top parts also vary in conformity with the work piece which is to be clamped in. In order to be able to take this change of the jaw weight into consideration, it is proposed pursuant to a further feature of the present invention to provide the compensating piston of the centrifugal force compensating cylinder with a piston rod which extends out of the chuck body and on which a compensating weight can be exchangeably mounted. By exchanging this compensating weight, the centrifugal force compensation can be adapted to the top jaw part which is being used at any given time.

In order to avoid the danger of injury to the operator due to compensating weights which project out of the contour of the chuck, it is finally proposed pursuant to the present invention to arrange the compensating weight in a recess of the chuck body.

DESCRIPTION OF PREFERRED EMBODIMENTS

Referring now to the drawings in detail, in all of the embodiments, shown is the front end of the spindle 1 of a machine tool which is not illustrated in detail. The chuck body 2 of the chuck in question is mounted on the flange of the spindle 1. Mounting is effected by a chuck mounting screw which is omitted from the drawing to facilitate illustration. The axis of rotation of the chuck is indicated by a dot-dash line.

The first embodiment of FIG. 1 involves a power-operated two-jaw chuck having a fixed clamping or chuck jaw 3 which, through the interposition of a key 4, is mounted on the chuck body 2 by means of two jaw screws 5. The movable clamping or chuck jaw 6 is guided in radial guides of the chuck body 2. The jaw 6 is operated by means of a pressure medium piston 7, the piston rod 8 of which is connected with an extension 6a of the jaw 6 by means of a screw 9. For this purpose, the extension 6a projects toward the rear into the chuck body 2. In the sectional view of FIG. 1, the jaw 6 is shown nearly in its radially outer end position.

The pressure medium piston 7 is guided in a cylindrical bore 2a which is radially directed in the chuck body 2 and is closed off by a cover 10. The cover 10, which is inserted into the chuck body 2 in a sealed manner, is provided with an abutment which has a smaller diameter and against which the pressure medium piston 7 rests in its radially outermost end position.

The working chamber A of the pressure medium piston is located on the side of the cover 10 for an external clamping of a work piece, and is connected by means of a connecting line 11 disposed in the chuck body 2 with a releasable check valve 12 which is disposed in the chuck body 2. Although in the illustrated embodiment of check valve 12 is disposed in the chuck body 2 in the radial direction, it can also be tangentially disposed in the chuck body 2 in order to keep its components free from the influences of centrifugal force. On the in-flow or afflux side of the valve ball 12b, which is stressed by a valve spring 12a, the check valve 12 communicates via a feed line 13 with a source of pressure medium, the latter not being shown in the drawing. For this purpose, a pressure medium transfer housing is utilized in a known manner. This housing is arranged on the spindle 1 of the machine tool, and connects the rotating spindle 1 with the stationary source of pressure medium.

The working chamber A of the pressure medium piston 7 is furthermore connected with the pressure chamber D of a centrifugal force compensating cylinder 14, the compensating piston 15 of which is designed as a centrifugal weight and is radially movably guided in the chuck body 2. The radially outer end of the piston 15 projects into the pressure chamber D. The line 16 connects the pressure chamber D of the cylinder 14 with the connecting line 11.

In the embodiment of FIG. 1, the cylinder 14 is formed by the compensating piston 15 and a cylindrical bore 2b which is disposed in the chuck body 2 and is radially directed. The cylinder space is also closed off by a cover 17, which is inserted into the chuck body 2. The piston rod 15a of the compensating piston 15 passes through this cover 17. A compensating weight 18 is mounted on the outer end of the piston rod 15a by means of a screw 19. As can be seen in FIG. 1, the compensating piston 15 is stressed counter to the centrifugal force by means of a return spring 20. The compensating weight 18 is disposed in a recess of the cover 17, so that it does not project beyond the cylindrical contour of the chuck body 2.

To clamp a work piece between the fixed jaw 3 and the movable jaw 6, pressure medium is supplied via the feed line 13 to the chuck body 2. This pressure medium lifts the valve ball 12b, counter to the force of the valve spring 12a, from its seat within the check valve 12, so that the pressure medium can pass via the connecting line 11 into the working chamber A of the pressure medium cylinder which is designed for driving the jaw 6. In conformity with the pressure of the pressure medium, the jaw 6 is pressed in this manner against the work piece, which is thereby clamped in between the jaws 3 and 6. Due to the supply pressure, and via the line 16, the pressure medium is also in the pressure chamber D of the centrifugal force compensating cylinder 14. Consequently, the compensating piston 15 of the cylinder 14 is situated in its radially inner end position.

As soon as the chuck, after the work piece has been clamped in, is caused to rotate for carrying out machining operations, centrifugal forces are exerted on the movable jaw 6, the pressure medium piston 7 which drives the jaw 6, and the compensating piston 15. The centrifugal forces exerted on the jaw 6 and on the pressure medium piston 7 would lead to a reduction of the clamping force generated by the pressure medium located in the working chamber A if a compensation did not result by means of the compensating piston 15. This compensation occurs due to the fact that the centrifugal force urges the compensating piston 15 radially outwardly, as a result of which the pressure in the pressure chamber D of the cylinder 14 increases. This increase in pressure is transmitted via the line 16 and the connecting line 11 to the working chamber A of the pressure medium cylinder. Since the line 16 is connected to the connecting line 11 which leads to the working chamber A of the pressure medium cylinder behind the valve ball 12b of the check valve 12, the increase in pressure caused by the centrifugal force remains trapped in the chuck body 2. This increase in pressure accordingly opposes the loss of clamping force due to the centrifugal force acting on the jaw 6 and the pressure medium piston 7. A complete compensation can be achieved by matching the exchangeable compensating weight 18 exactly to the conditions being encountered.

So that the centrifugal force compensation is effective independent of the level of the working pressure, the radially inwardly located relief chamber E of the centrifugal force compensating cylinder 14 is directly, i.e. by-passing the check valve 12, connected via a short-circuit line 21 with the feed line 13 which comes from the source of pressure medium. By means of this additional connection, the compensating piston 15, at the start of rotation of the chuck, is stressed on both sides with the operating pressure of the pressure medium, so that even a slight cenntrifugal force exerted on the compensating piston 15 leads to an increase of pressure in the pressure chamber D of the centrifugal force compensating cylinder 14, and hence in the working chamber A of the pressure medium cylinder. Prior to the start of the rotary movement, the return spring 20 ensures that when the chuck is stopped, the compensating piston 15 is located in its radially inner end position.

To release the work piece, the counter-chamber G of the pressure medium cylinder is subjected to pressure medium which is supplied via a release line 22. Pressure medium is simultaneously fed to the check valve 12 via a line 23. This pressure medium actuates a release piston 12c which lifts the valve ball 12b from its valve seat counter to the force of the valve spring 12a, so that pressure medium can escape from the working chamber A of the pressure medium cylinder via the connecting line 11, the check valve 12, and the feed line 13.

In the subsequent embodiments, identical or comparable parts of the chuck have the same reference numerals as those which were used with the aforementioned embodiment.

Figure 2:
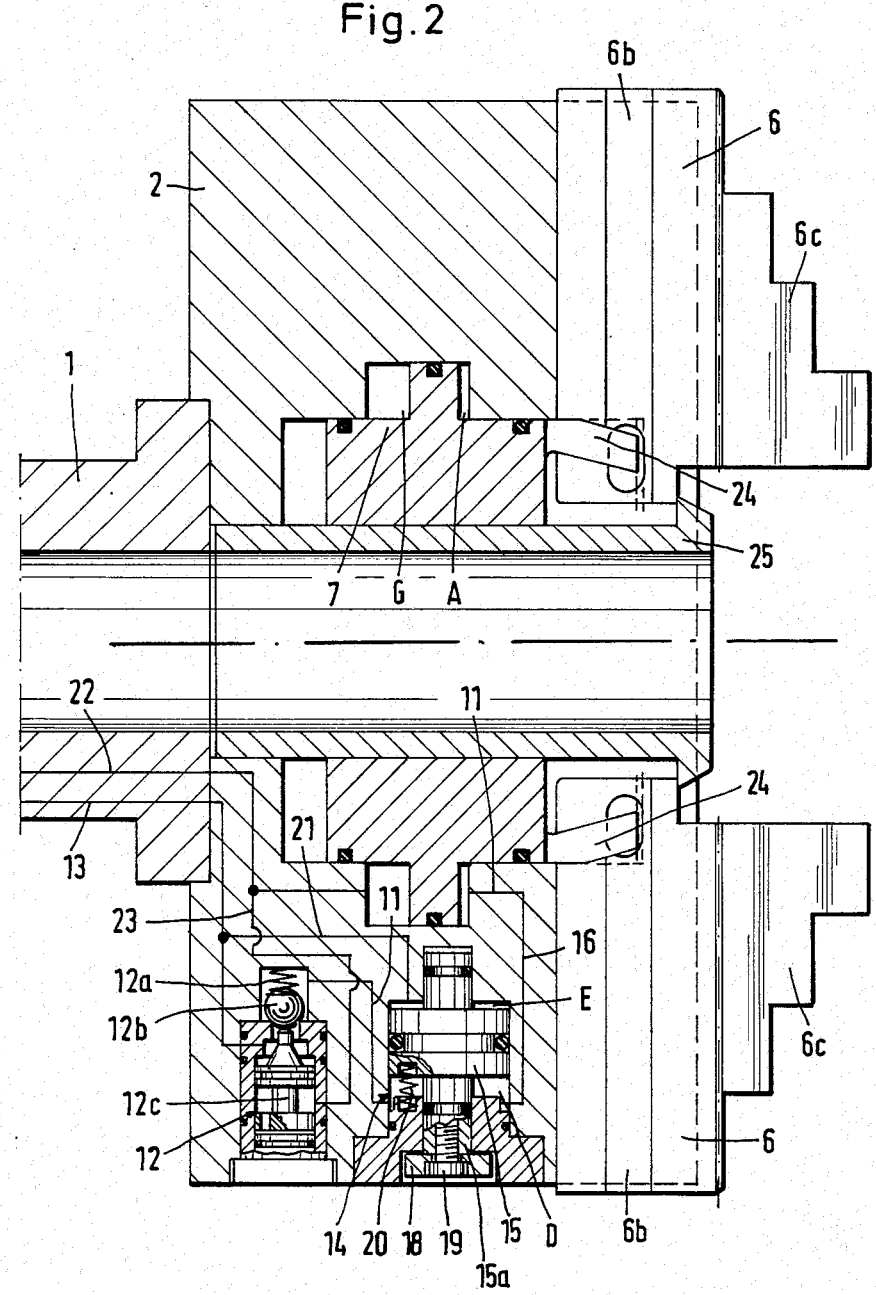
FIG. 2 is a cross section through a second inventive embodiment of a chuck having a plurality of radially movably jaw which are actuated in common by means of a key gearing by a pressure medium piston which is axially movable in the chuck body.

In the second embodiment pursuant to FIG. 2, several jaws 6 are movably guided in a chuck body 2. Although only two such movable jaws 6 are shown in the drawing, the chuck can also be provided with three or more jaws 6. In the illustrated embodiment, each of these jaws 6 comprise a base jaw part 6b and a top jaw part 6c. The jaw parts 6b and 6c are connected with one another by means of a toothing, so that the top part 6c can be offset in the radial direction relative to the base part 6b. Furthermore, it is also possible to exchange the top jaw part 6c.

The operation or movement of the base parts 6b of all of the jaws 6 is effected together via respective key gearings, and a pressure medium piston 7, which in contrast to the first embodiment is movably guided in the axial direction in the chuck body 2. This pressure medium piston 7 is connected via key hooks 24 with corresponding keyways of the base parts 6b in such a way that when the pressure medium piston 7 moves to the left in FIG. 2, a radially inner movement of the jaws 6 is effected. To form the pressure medium cylinder, and to protect the key gearing, a sleeve 25 is disposed in the central opening of the chuck body 2.

A releasable check valve 12 is also arranged in the chuck body 2 in the second embodiment of FIG. 2. The valve ball 12b, which is stressed by a valve spring 12a, is connected between the feed line 13 and the connecting line 11. A portion of this connecting line 11 at the same time serves as the line 16, which connects the working chamber A of the pressure medium piston 7 with the pressure chamber D of a centrifugal force compensating cylinder 14 which, in the same manner as with the first embodiment, is disposed in the chuck body 2. The relief chamber E of this cylinder is furthermore connected with the feed line 13 via the short-circuit line 21, by-passing the check valve 12. Finally, FIG. 2 shows the release line 22 which leads to the counter-chamber G of the pressure medium piston 7 and which, for actuating the release piston 12c, is also connected with the check valve 12 via a line 23.

Also in the second embodiment a clamping of a non-illustrated work piece is effected by supplying pressure medium through the feed line 13. The pressure medium, which is under a certain pressure, lifts the valve ball 12b of the check valve 12 counter to the force of the valve spring 12a from its valve seat and passes via the first part of the connecting line 11 to the pressure chamber D of the centrifugal force compensating cylinder 14. The pressure medium then flows through the second part of the connecting line 11 into the working chamber A of the pressure medium cylinder, so that the pressure medium piston 7 thereof is displaced toward the left in FIG. 2. The key hooks 24 connected with the pressure medium piston 7 hereby pull the jaws 6 radially inwardly, so that the work piece is clamped in. As soon as the working pressure has been obtained in the working chamber A of the pressure medium cylinder, the valve spring 12a closes the check valve 12. The chuck can now be caused to rotate, and machining of the work piece can begin. Since with increasing speed the stresses of the jaws 6 are subjected to the centrifugal force, the clamping force would be reduced if a compensation were no effected by the centrifugal force compensating cylinder 14. This compensation occurs due to the fact that the compensating piston 15 is also pulled radially outwardly as a result of the centrifugal force. As a result, the pressure in the pressure chamber D increases. This increase in pressure is passed on via the line 16 to the working chamber A of the pressure medium cylinder, so that the loss of clamping force caused by the action of centrifugal force on the jaws 6 is compensated for by an increase of the effective pressure of the pressure medium which acts on the pressure medium piston 7. In order to be able to adapt the compensation force which becomes effective due to the centrifugal force compensating cylinder 14 to the respective weights of the jaws 6, especially when the top jaw parts 6c are exchanged, the compensating weight 18 which is connected with the compensating piston 15 is exchangeable.

The preceding description of the second embodiment in connection with FIG. 2 shows that a centrifugal force compensating cylinder 14 can be used for a plurality of jaws 6, with these jaws 6 being actuated in the discribed embodiment by means of a common pressure medium piston 7 which is axially movable in the chuck body 2. The jaws 6 are opened for release of a work piece in the manner described in connection with the first embodiment.

Figure 3:
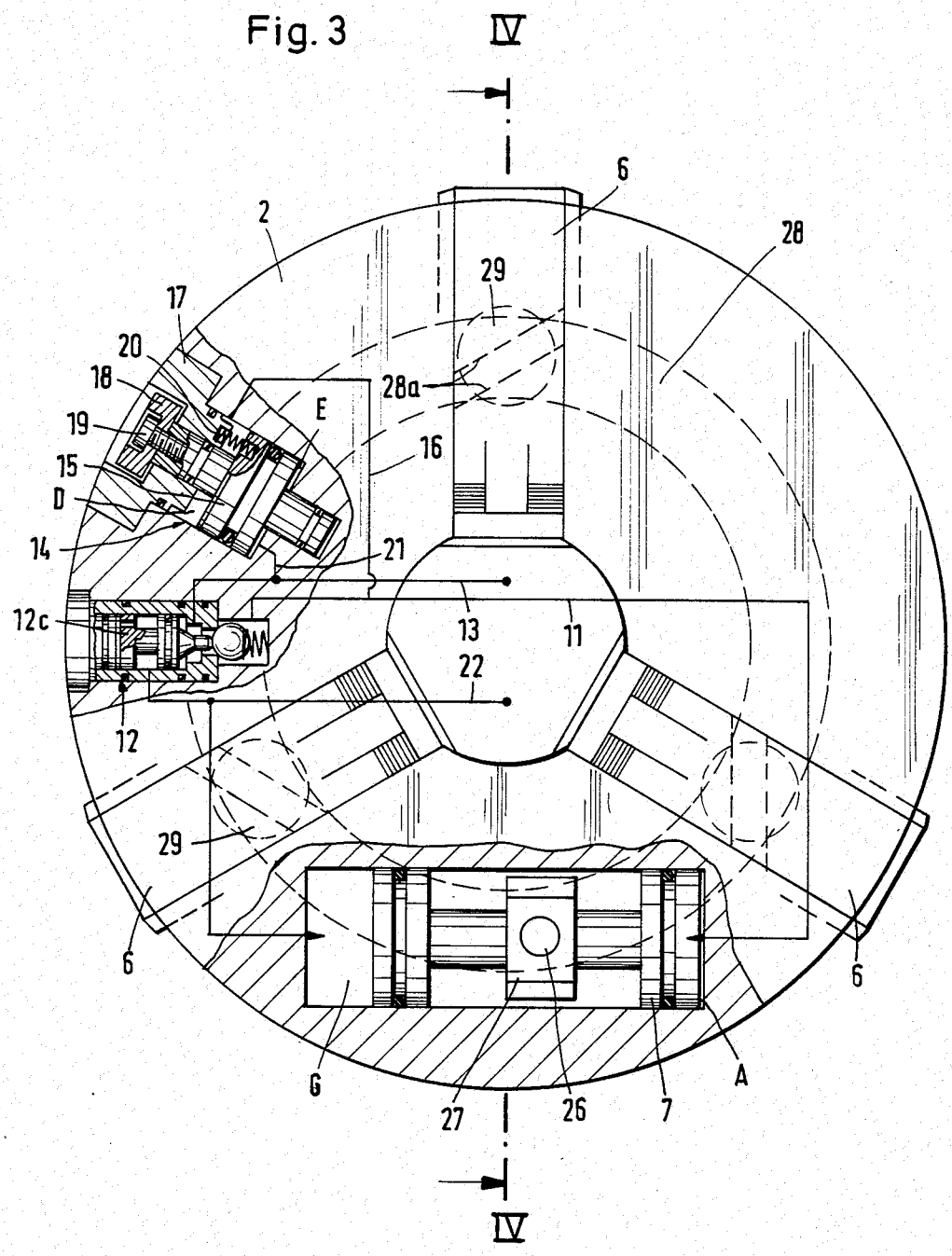
FIG. 3 is a partially sectioned front view of a chuck having three jaws which are actuated by means of a thrust ring which is rotatably mounted in the chuck body, and by a pressure medium piston which is tangentially movable in the chuck body.
Figure 4:
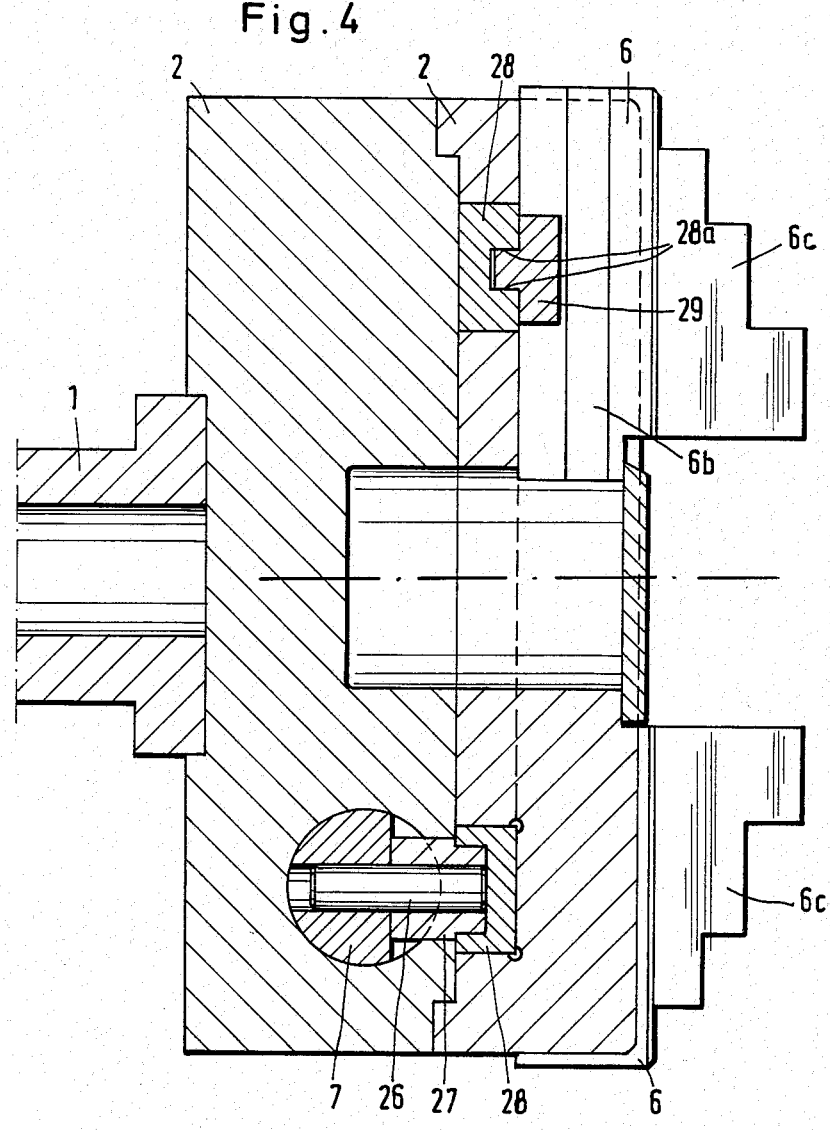
FIG. 4 is a cross section through a chuck taken along the line IV—IV in FIG. 3.

In the third embodiment shown in FIGS. 3 and 4, the chuck body 2 is provided with three jaws 6, each of which is again formed by a base port 6b and a top part 6c. The actuation of these jaws 6, which are radially guided in the chuck body 2, is effected in common by a pressure medium piston 7 which is arranged in the chuck body 2 in such a way as to be tangentially movable. This pressure medium piston 7 carries on a pin 26 a slide ring 27 which engages in a recess of a thrust ring 28. The thrust ring 28 is rotatably guided in the two-piece chuck body 2. The thrust ring 28 is provided with key surfaces 28a for three key blocks 29, one of which is respectively associated with each of the jaws 6. Rotation of the thrust ring 28 results in a radial displacement of the jaw 6, as can be clearly seen in FIG. 3. Also with this embodiment, the feed line 13 is connected with the working chamber A of the pressure medium cylinder via a releasable check valve 12 and a connecting line 11, whereas the release line 22 leads to the release piston 12c of the check valve 12. Furthermore, the connecting line 11 is connected with the pressure chamber D of a centrifugal force compensating cylinder 14, and in particular via a line 16. A short-circuit line 21 finally connects the feed line 13 with the relief chamber E of this centrifugal force compensating cylinder 14, bypassing the check valve 12.

As can be seen particularly from FIG. 3, when the pressure medium piston 7 is stressed with pressure due to pressure medium being fed to the working chamber A, this pressure medium piston 7 is displaced toward the left in the drawing. As a result, the thrust ring 28 is taken along in a clockwise rotation by means of the pin 26 and the slide ring 27. Such a rotation of the thrust ring 28 effects via the key blocks 29 an inward radial displacement of the jaws 6, so that a work piece can be clamped in between the top jaw parts 6c. When the required clamping force has been obtained, i.e. when the intended pressure in the working chamber A of the pressure medium piston 7 has been obtained, the check valve 12 closes.

During a subsequent rotation of the chuck body 2, the compensating piston 15 and the compensating weight 18 of the centrifugal force compensating cylinder 14 are subjected to centrifugal force, as a result of which the pressure of the pressure medium in the pressure chamber D increases. Conveying this increase in pressure via the line 16 to the working chamber A of the pressure medium cylinder effects a compensation of the centrifugal force exerted on the jaws 6.

If, when the chuck has been stopped, the work piece clamped in between the jaws 6 is to be released, pressure medium is fed over the release line 22 and acts on the release piston 12c which lifts the valve ball 12b from the valve seat so that the check valve 12 can be opened. The pressure medium can now flow out of the working chamber A of the pressure medium cylinder, the pressure medium piston 7 of which is shifted toward the right in FIG. 3 due to the pressure medium flowing via the line 22 into the counter-chamber G. As a result, the thrust ring 28 is turned counter clockwise. This rotation leads via the key blocks 29 to a radially outward displacement of the jaws 6, and hence to a release of the work piece.

The fourth embodiment, shown in FIGS. 5 and 6, again shows a three-jaw chuck, with each of the jaw 6, which project radially inwardly into a central bore of the chuck body 2, being actuated by its own pressure medium piston 7. Each of these pressure medium pistons 7 is radially movable in a cylindrical bore 2a of the chuck body 2, and is provided with a piston rod 8 to which the respective jaw 6 is fastened by means of a screw 9. So far, the construction of the pressure medium cylinder is the same as in the first embodiment.

In order to be able to effect a central clamping of the jaw 6 despite the use of separate pressure medium pistons 7, slide rings 31 are arranged on the piston rods 8 of the pressure medium pistons 7 by means of a pin 30; these slide rings 31 engage in corresponding recesses in a synchronizing ring 32. This ring 32 is rotatably mounted in an annular recess of the chuck body 2, and is prevented from falling out by means of a cover 33. By means of a positive connection of the individual jaws via the piston rods 8 of the pressure medium piston 7, the synchronizing ring 32 provides for a synchronous movement of all three of the jaws 6.

Also with the fourth embodiment, a releasable check valve 12 is arranged at the end of the feed line 13. The space behind the valve ball 12b of this check valve 12 is connected via the connecting line 11 with the working chambers A of all three of the pressure medium pistons 7. Furthermore, via a line 16 the working chambers A of all three of the pressure medium cylinders are connected with the pressure chamber D of a centrifugal force compensating cylinder 14. Despite the presence of three pressure medium pistons 7, only a single cylinder 14 is arranged in the chuck body 2. The relief chamber E of this cylinder 14 is connected via a short-circuit line 21 with the feed line 13, again by-passing the check valve 12. The counter-chambers G of all three of the pressure medium cylinders are connected with the release line 22 which, via a line 23, is additionally connected with the release piston 12c of the check valve 12.

Also with this embodiment, the reduction of the clamping force effected by the centrifugal force of the jaws 6, the piston rods 8, and the pressure medium pistons 7 is compensated for by an increase of the effective pressure in the working chambers A of the pressure medium cylinder. This increase of effective pressure results from centrifugal force acting on the compensating piston 15 and its compensating weight 18. The action of the centrifugal force compensating cylinder 14 is therefore also present with a plurality of pressure medium cylinders, each of which drives its own jaw 6.

Figure 5:
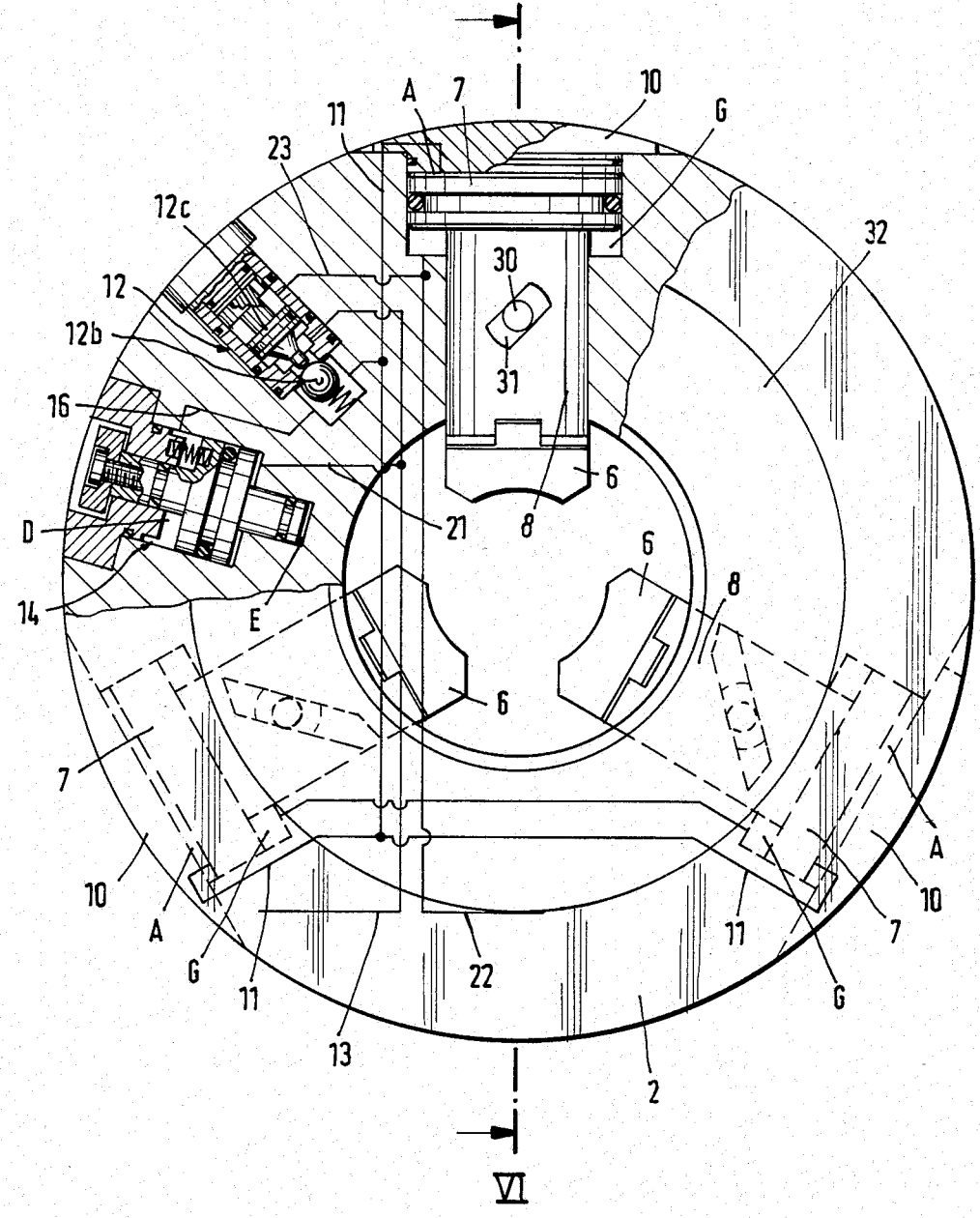
FIG. 5 is a partially sectioned front view through a fourth inventive embodiment having three jaws which are respectively driven by their own pressure medium piston, with the movements of the jaws being synchronized by a synchronizing ring.
Figure 6:
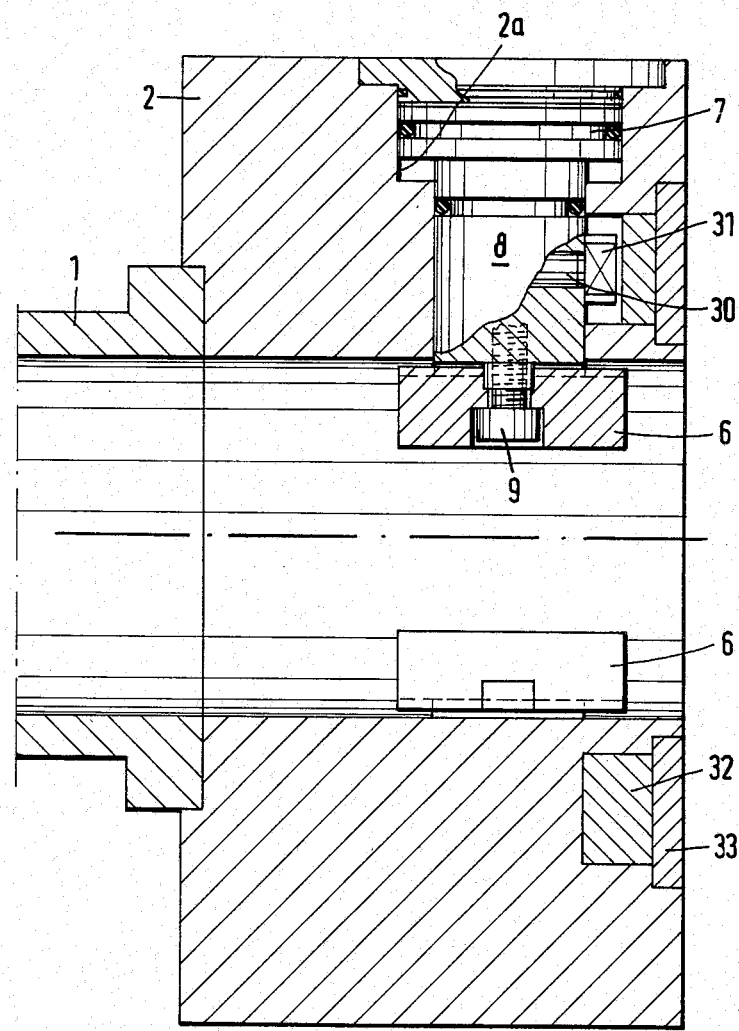
FIG. 6 is a cross section of the chuck taken along the line VI—VI in FIG. 5.
Figure 7:
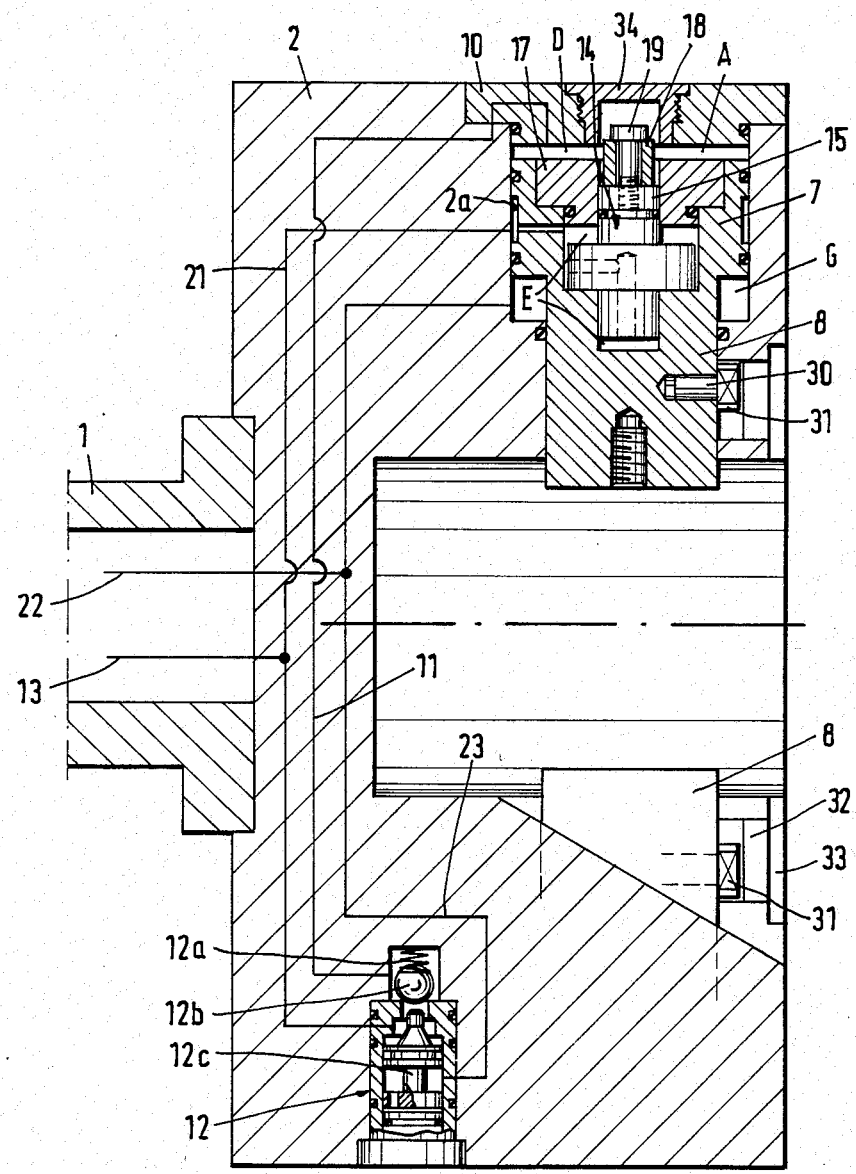
FIG. 7 is a cross section through a fifth inventive embodiment having several jaws which are respectively actuated by their own pressure medium piston and are provided with a built-in compensating piston.

The fifth embodiment, shown in FIG. 7, shows an alternative design of the chuck of FIG. 5. In the embodiment of FIG. 7, each pressure medium piston 7 is provided with a compensating piston 17 which for simplification is built directly into the pressure medium piston 7. The compensating piston 15, which is provided with a replaceable compensating weight 18 which is fastened by means of a screw 19, is guided in a recess provided in the head of the pressure medium piston 7. In particular, the compensating piston 15 is provided on the radially outer end of the piston 7 in an additionally inserted cover 17. In order to be able to exchange the compensating weight 18 despite the fact that the centrifugal force compensating cylinder 14 is built into each pressure medium piston 7, the cover 10 which closes off the cylindrical bore 2a in the chuck body 2 for each pressure medium piston 7 is provided with a central screw cap 34 which can be turned out if the compensating weight 18 needs to be exchanged.

Also with the fifth embodiment, the centrifugal force exerted on the compensating piston 15 and its compensating weight 18 effects an increase of pressure in the pressure chamber D of the centrifugal force compensating cylinder 14, with this pressure chamber D at the same time being the working chamber A of the pressure medium piston 7. So that also in this case the compensation of the centrifugal force is independent of the level of the working pressure, the relief chamber E of the centrifugal force compensating cylinder 14 is again connected via a short-circuit line 21 with the feed line 13, by-passing the check valve 12. In so doing, when the chuck is stopped, the same pressure is produced on opposing pressure surfaces of the compensating piston 15, so that already when the chuck is started, an increase in pressure takes place in the pressure chamber D and hence in the working chamber A of all of the pressure medium pistons 7.

With those embodiments of the foregoing described chucks which are suitable for an inner clamping, namely the two embodiments shown in FIG. 2 and FIGS. 3 and 4, the arrangement of the centrifugal force compensating cylinder 14 effects a reduction of the clamping force when the jaws, which engage in a bore of the work piece, are pulled additionally radially outwardly due to the centrifugal force. This results from the fact that with an inner clamping of a work piece, the increase of clamping force occurs due to pressure stressing of the counter-chamber G of the pressure medium pistons 7. Since with increasing speed the compensating pistons 15 of the centrifugal force compensating cylinders 14 effect an increase in pressure in the working chamber A, this increase in pressure acts counter to the clamping force generated in the counter-chamber G during inner clamping. In this way, an over stressing of the work pieces is avoided, which otherwise could, for example with work pieces which are sensitive to deformation, lead to an undesired widening of the work pieces and hence could lead to an imperfect machining.

The present invention is, of course, in no way restricted to the specific disclosure of the specification and drawings, but also encompasses any modifications within the scope of the appended claims.

What is claimed is:

1. A power-operated chuck for turning machines, said chuck comprising:
   a chuck body;
   at least one movable jaw which is radially guided in said chuck body;
   a pressure medium cylinder which is provided with a working chamber, and a pressure medium piston which is movably guided in said chuck body; said pressure medium piston being operatively associated with said at least one movable jaw for actuating same;
   a source of pressure medium;
   a releasable check valve, with said working chamber of said pressure medium cylinder being connected to said source of pressure medium via said check valve; and
   a centrifugal force compensating cylinder having a pressure chamber which communicates with said working chamber of said pressure medium cylinder; said centrifugal force compensating cylinder being provided with a compensating piston which is designed as a centrifugal weight, and which is radially movable within said chuck body; said compensating piston having a radially outer end which projects into said pressure chamber of said centrifugal force compensating cylinder; said centrifugal force compensating cylinder also having a relief chamber; and a short-circuit line for directly connecting said relief chamber with said source of pressure medium; said compensating piston having a radially inner end which projects into said relief chamber of said centrifugal force compensating cylinder.

2. A chuck according to claim 1, which includes a return spring associated with said chuck body for loading said compensating piston counter to centrifugal force.

3. A chuck according to claim 1, which includes several movable jaws which are radially guided in said chuck body; which includes a pressure medium cylinder and associated piston for each of said movable jaws; and which includes a common centrifugal force compensating cylinder, with the working chambers of all of said pressure medium cylinders being connected with one another and with said pressure chamber of said centrifugal force compensating cylinder.

4. A chuck according to claim 3, in which said compensating piston of said centrifugal force compensating cylinder is provided with a piston rod which extends radially outwardly from said chuck body; and which includes a compensating weight which is exchangeably fastened to said piston rod.

5. A chuck according to claim 4, in which said chuck body is provided with a recess by means of which the radially outer portion of said piston rod is accessible; with said compensating weight being disposed in said recess.

* * * * *